United States Patent [19]

Hockenbrock

[11] 4,342,942
[45] Aug. 3, 1982

[54] PROJECTION TUBE ALIGNMENT MEANS

[75] Inventor: Richard L. Hockenbrock, Mundelein, Ill.

[73] Assignee: Zenith Radio Corporation, Glenview, Ill.

[21] Appl. No.: 197,883

[22] Filed: Oct. 17, 1980

Related U.S. Application Data

[63] Continuation-in-part of Ser. No. 154,197, May 29, 1980, which is a continuation-in-part of Ser. No. 110,413, Jan. 7, 1980.

[51] Int. Cl.³ ................... H01J 31/00; H01J 61/30
[52] U.S. Cl. ................... 313/477 R; 220/2.1 A; 65/58
[58] Field of Search ................ 313/474, 477, 478; 220/2.1 A

[56] References Cited

U.S. PATENT DOCUMENTS

| | | | |
|---|---|---|---|
| 2,467,462 | 4/1949 | Brown | 313/478 |
| 2,961,560 | 11/1960 | Fyler | 313/408 |
| 3,369,881 | 2/1968 | Bennett et al. | 65/58 |
| 3,384,712 | 5/1968 | Gruen | 313/474 X |
| 4,028,580 | 6/1977 | Dougherty | 313/406 |

*Primary Examiner*—Robert Segal
*Attorney, Agent, or Firm*—Ralph E. Clarke, Jr.

[57] ABSTRACT

An article of manufacture is disclosed for use in a projection television system. The article comprises a cathode ray picture tube having a funnel and a circular face panel with a rearwardly extending skirt and a window for receiving a cathodoluminescent imaging screen. The panel skirt is conjoinable with the funnel by mating along interfacing edges. The seal edge of the panel skirt defines a plane whose normal makes a non-zero acute cant angle with respect to the axis of the window. The funnel seal edge defines a plane whose normal makes a non-zero acute cant angle with respect to the funnel axis. The tube according to the invention is characterized by having a first pair of embossments on the funnel azimuthally spaced 180 degrees apart adjacent to seal edge of the funnel, and a second pair of embossments on the face panel skirt azimuthally spaced 180 degrees apart and adjacent to the seal edge of the skirt. The azimuthal position of the first and second pairs of embossment are predetermined such that the alignment of said pairs is effective to indicate the relative rotational position of the face panel and funnel and the predetermined tilt of the electron optical axis with respect to the projection optical axis.

4 Claims, 12 Drawing Figures

PROJECTION TUBE ALIGNMENT MEANS

CROSS REFERENCE TO RELATED APPLICATIONS

This application is a continuation-in-part of copending application Ser. No. 154,197 filed May 29, 1980, a continuation-in-part of application Ser. No. 110,413 filed Jan. 7, 1980, now U.S. Patent No. 4,274,110; and is related to but in no way dependent upon application Ser. No. 127,603 filed Mar. 3, 1980, all of common ownership herewith.

BACKGROUND OF THE INVENTION AND PRIOR ART DISCLOSURES

This invention is concerned with television systems, and is particularly directed to projection television systems in which discrete images are projected on a viewing screen to provide a composite color picture.

In FIG. 1 there is depicted schematically the essentials of such a projection television system. The system 70 has a viewing screen 72 for displaying a light image cast thereon. Screen 72 is remotely located from a plurality of light projection means 74, 75 and 76. Two of the light projection means, designated as being projection means 75 and 76, have projection optical axes 78 and 79, respectively, lying at a non-zero, acute-angle A with respect to the viewing screen axis 80. These are termed "off-axis", or "displaced axis" tubes.

With reference also to FIG. 2 wherein off-axis projection means 76 is depicted in greater detail, projection means 76 is indicated as including a cathode ray tube means 82 having a cathodoluminescent screen 84 on the inside surface of the face panel 86 whose axis is substantially parallel to the projection optical axis 79. The seal land 85 indicates the junction of the seal edge of face panel 86 and the seal edge of funnel 87 of cathode ray tube 82; the significance of the seal edges and the seal land 85 and their orientation is described infra. The screen is made cathodoluminescent by a deposit of a monochrome phosphor which may comprise, for example, one of a number of phosphors emitting red, green or blue light upon excitation by an electron beam. The electron beam generating means 88, which is typically an electron gun, is disposed on the electron-optical axis 90 of cathode ray tube 82. Electron beam generating means 88 is indicated as emitting a scanning electron beam 92 which forms an electron image on the cathodoluminescent screen 84 in response to television signal information. The electron image is converted to a visible image by cathodoluminescent screen 84 as screen 84 is excited by beam 92.

Lens means 94 on projection optical axis 79 provides for projecting on viewing screen 72 the light image of the electron-formed visible image on cathodoluminescent screen 84. The light image inherently has a non-linear magnification distortion attributable to the location of projection means 76 off the viewing screen axis 80.

Two types of optical distortion are inherent in the system which can degrade through misconvergence the composite projected image to the point of unacceptability. The two types are trapezoidal distortion and horizontal non-linearity distortion, and are best described by the single term "non-linear magnification distortion." The non-linear magnification distortion exhibited by the light images projected on viewing screen 72 by light projection means 75 and 76 is shown in FIG. 1 as comprising, respectively, trapezoidally distorted images 96 and 98. An undistorted image 102 is represented by the solid lines. Horizontal non-linearity distortion is also present although not shown. It is manifested as a progressive stretching of the projected image from left to right as projected by projected means 76. Conversely, horizontal non-linear distortion of the image projected by projection means 75 is manifested by a progressive stretching of the image from right to left.

With reference again to FIG. 2, the projection television system according to the invention described and fully claimed in referent copending application Ser. No. 110,413, incorporated herein by reference, is characterized by the electron-optical axis 90 of cathode ray tube means 82 defining a non-zero, acute angle B with respect to the axis of cathodoluminescent screen 84. The value of angle B and the orientation of the electron-optical axis is selected to cause the electron-formed visible image to have an orientation and non-linear magnification distortion effective to substantially compensate for the off-axis-induced non-linear distortion of the projected light image.

The remedial effect is depicted in FIG. 3, which is view looking over the screen 72 and toward the projection television system 70. The electron-formed visible images 104A and 104A' have an orientation and non-linear magnification distortion effective to substantially compensate for the off-axis-induced non-linear magnification distortion of the projected light image. Images 104A and 104A' are shown as being reversed in orientation by transmission through lens means 94 and 94'. The shapes of the images in space as projected on viewing screen 72 are indicated respectively by light images 104B and 104B'. It will be seen that images 104A and 104A' upon projection substantially compensate for the off-axis-induced non-linear magnification distortion, as indicated by the composite image 105 cast on viewing screen 72, depicted as being substantially free of trapezoidal distortion, and which is also free of horizontal non-linearity distortion.

Off-axis light projection means 75 is substantially identical to light projection means 76, and can be considered to be its mirror image, with the orientation of components substantially reversed.

Light projection means 74 is shown as being on-axis; that is, the electron optical axis 106 of the cathode ray tube 108 is coincident with its projection optical axis and the axis 80 of viewing screen 72. Also, the electron-formed visible image 110A formed on its cathodoluminescent screen 112 is reactilinear. As a result, the light 110B projected by lens means 114 is also rectilinear, and the light image cast on screen 72 is in turn rectilinear and in coincidence with the images projected by light means 75 and 76, forming composite image 105.

Bennett et al in U.S. Pat. No. 3,369,881 discloses a method comprising the preparation of the funnel members and face panel members of cathode ray tubes for optimum alignment and sealing of such parts in the fabrication of tube envelopes. The method comprises the steps of forming complemental viewing panel portions and funnel portions for rectangular cathode ray tube envelopes. Each of the parts is formed with a plurality of external complemental reference protuberances. The reference protuberances on the funnel are used in the alignment of the neck and funnel prior to their conjoinment. Reference summits are ground on the protuberances on each funnel-neck part in accordance with a rotational and lateral alignment of the funnel, and in accordance with an axial alignment of the neck. Each pair consisting of a funnel and a face panel, may be optimally referenced to each other before sealing together by means of the reference summits, using a suitable fixture.

Fyler in U.S. Pat. No. 2,961,560 discloses a color television picture tube which includes structural assemblies for retaining the aperture mask in a unique position relative to the phosphor dot screen. The major reference points for location of the mask are provided on or adjacent to the viewing end of the bulb. In one embodiment of the invention, cast projections are molded as part of the inner surface and are spaced about the periphery of the viewing end of the bulb. The aperture mask is provided with fittings which cooperate with the locating members. To maintain firm contact of the mask fittings for the locating members springs are provided.

Faceplate-funnel referencing means are disclosed in U.S. Pat. No. 4,028,580 to Dougherty. A color cathode ray tube is depicted including a shadow mask and improved suspension devices for suspending the mask adjacent the faceplate of the tube. The disclosure stresses channel-shaped studs comprising part of the suspension devices. Each of the studs has a first portion adapted to be imbedded in the faceplate and a second portion having provision for coupling the stud to the shadow mask. The studs engage reference surfaces on the inside of the funnel when the faceplate and funnel are mated and thereby served to reference to faceplate to the funnel.

OBJECTS OF THE INVENTION

It is a general object of this invention to enhance the quality of projection television.

It is a more specific object of the invention to provide means and method for enhancing the quality of the projection television system described and fully claimed in the copending applications referred to herein.

It is a specific object of the invention to provide means and method for facilitating the manufacturing assembly of cathode ray tube components of the referent copending applications.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

(The following Figures 1–5 are substantially as show in referent copending application Ser. No. 154,197, of which the present application is a continuation-in-part. These drawings and associated descriptions are considered necessary for the understanding of the present invention.)

DESCRIPTION OF THE PREFERRED EMBODIMENTS

Figure 4A:
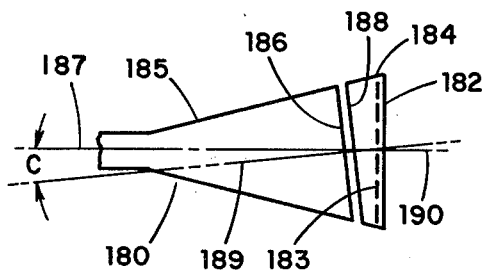
FIGS. 4A-C are schematic views illustrating the method of forming cathode ray tube components.
Figure 4B:
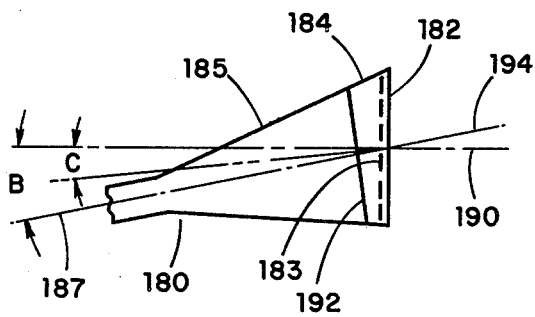
Figure 4C:
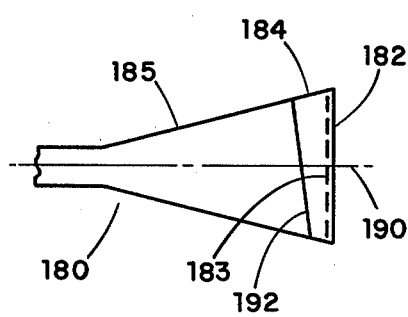

A cathode ray tube comprising an article of manufacture for use in a projection television system is depicted schematically in FIGS. 4A-C. The article of manufacture and method are fully described and claimed in referent copending application Ser. No. 145,197. The configuration depicted by FIGS. 4A-C can be utilized either for an on-axis or an off-axis cathode ray tube light projection means, as will be shown.

Picture tube 180 is shown as having a face panel 182 with a rearwardly extending skirt 184 conjoinable with a funnel 185. The skirt 184 of panel 182 mates with funnel 185 along interfacing funnel seal edge 186 and face panel seal edge 188.

Tube 180 has a cathodoluminescence imaging screen 183 deposited on the inner surface or "window" of face panel 182; the axis of the window (and cathodoluminescent screen) is indicated as being substantially coincident with the electron-optical axis 187, and normally coincident with projection optical axis 190. Imaging screen 183 provides an electron-formed visible image for projection on the viewing screen.

Funnel seal edge 186 is formed as depicted to define a plane whose normal makes an angle (designated at being angle C) with respect to the funnel axis 189 substantially equal to one-half the aforedescribed angle A. Seal edge 188 on the skirt 184 of face panel 182 is formed to define a plane whose normal makes an angle (also indicated as being an angle C) with respect to the axis of the imaging screen 183, or window, substantially equal to one-half said angle A. Thus the seal edge of skirt 184 defines a plane whose normal makes a non-zero acute cant angle with respect to the axis of window 183. Similarly, funnel seal edge 186 defines a plane whose normal makes a non-zero acute cant angle with respect to the funnel axis.

Funnel 185 is aligned with respect to face panel 182 to tilt the electron-optical axis 187 with respect to the projection optical axis 190 by an angle B substantially equal to said angle A; this configuration is shown by FIG. 13B. When seal edges 186 and 188 are conjoined, forming seal land 192, the value of angle B and the orientation of the electron-optical axis 187 causes the electron-formed visible image on cathodoluminescence screen 183 to have an orientation and non-linear magnification distortion effective to substantially compensate for the off-axis-induced, non-linear magnification distortion of the light image projected thereby on the viewing screen. As depicted by FIG. 4B, funnel 185 is, in effect, aligned by its "rotation" with respect to face panel 184 a distance effective to provide the non-zero acute angle B having a desired value. The non-zero, acute angle B is that angle which is substantially equal to the aforedescribed angle A. The "rotation" of funnel 182 with respect to face panel 184 is typically about 180 degrees.

Figure 4D:
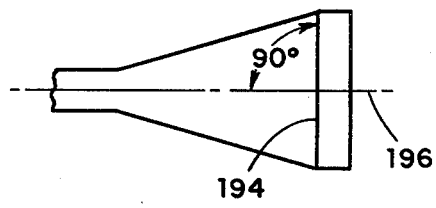
FIG. 4D is a schematic depiction of a standard cathode ray picture tube supplied by comparison purposes.

FIG. 4D depicts for comparison purposes a standard cathode ray tube wherein the interfacing seal edges (the conjoining of which is indicated by seal land 194) define a plane whose normal is coincident with the projection optical axis 196.

Figure 6:
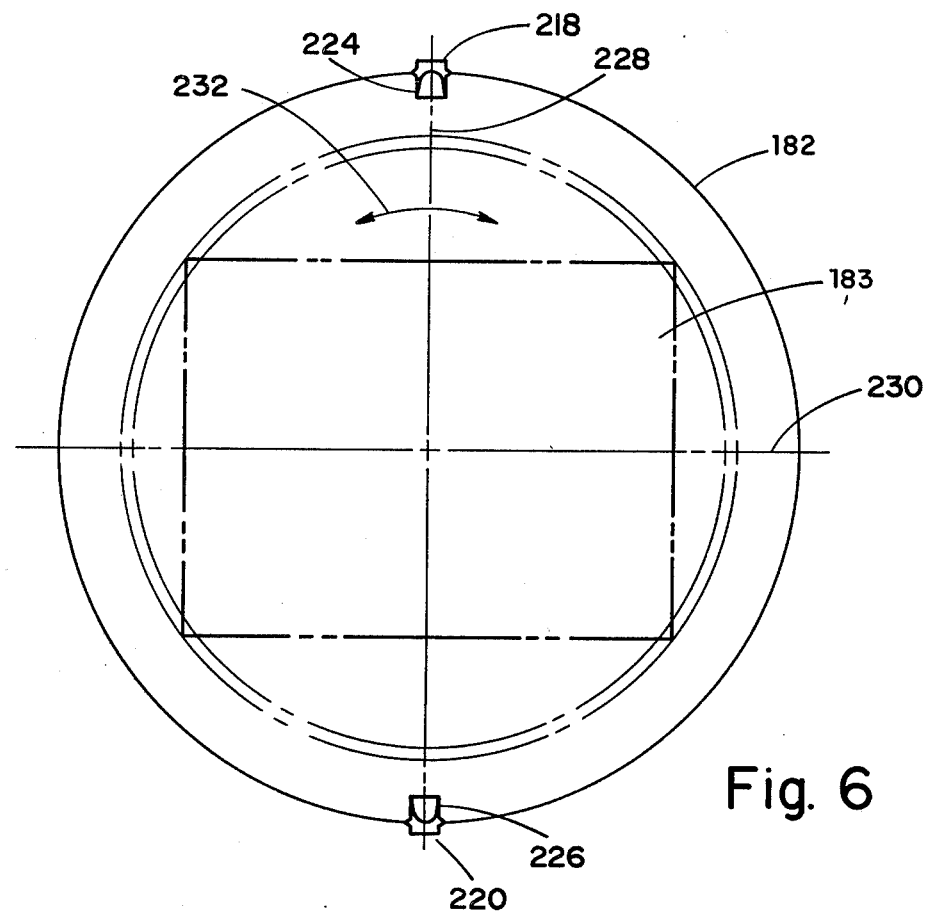
FIG. 6 is a plan view in elevation of the face panel of the cathode ray tube shown by FIGS. 5A-B, and depicting further aspects of the preferred embodiments of the invention.
Figure 5A:
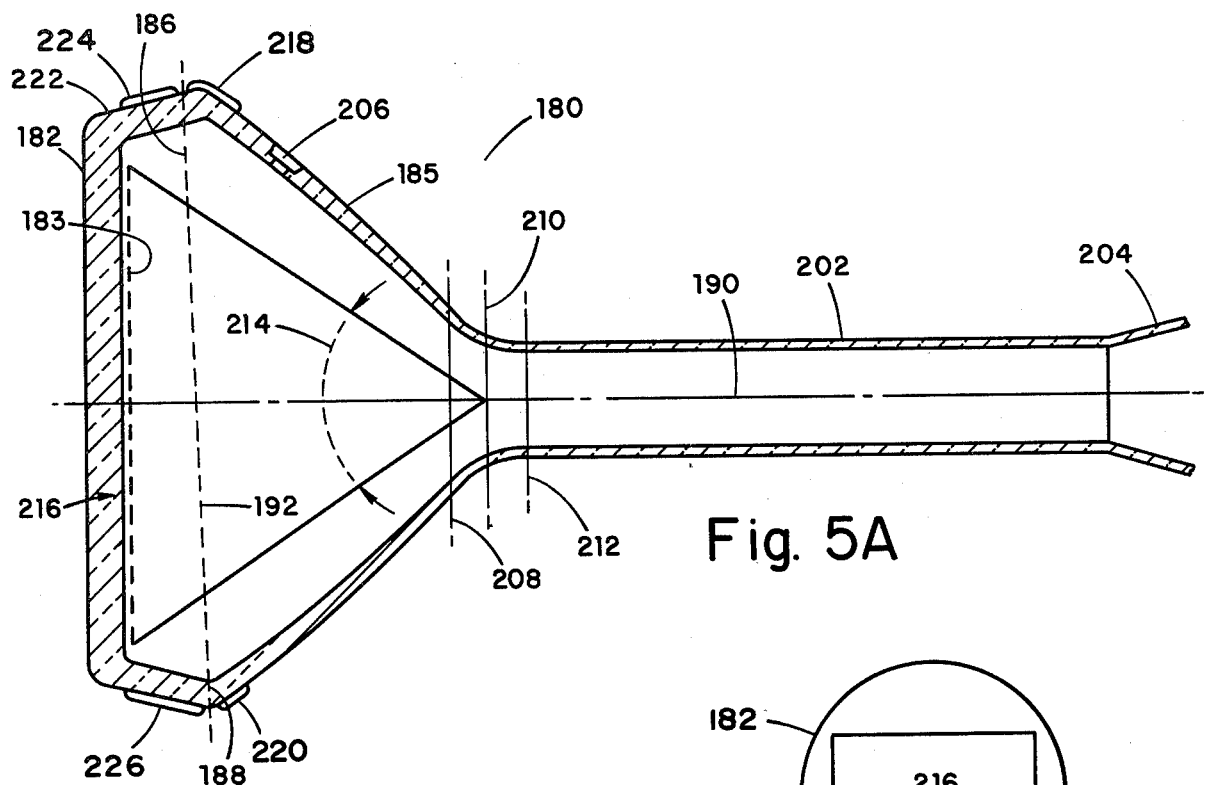
FIG. 5A-B are diagrams in section of cathode ray tube components depicting a preferred embodiment of the invention.
Figure 5C:
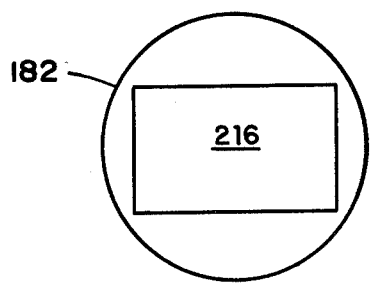
FIGS. 5C-D indicate schematically the effect of the respective components on the electron-formed visible image.
Figure 5B:
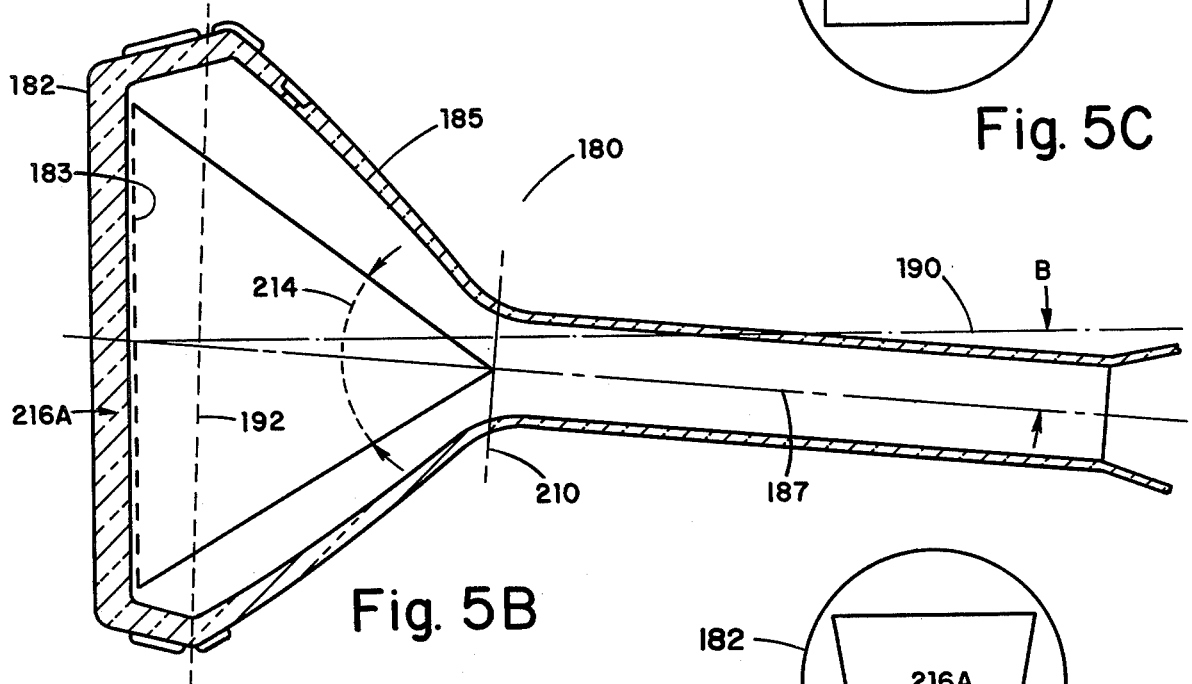

With reference now to FIGS. 5A-B and 6, the cathode ray tube according to the invention is characterized by having a first pair of embossments 218 and 220 on funnel 185 azimuthally spaced 180 degrees apart and, as depicted, adjacent to the seal edge 186 of funnel 185. A second pair of embossments 224 and 226 on the skirt 222 of face panel 182 are spaced 180 degrees apart adjacent the seal edge 188 of face panel skirt 222. The azimuthal position of the first pair of embossments 218 and 220 on funnel 185, and the second pair of embossments 224 and 226 on the face panel skirt 222, are predetermined such that when the pairs of the embossments are aligned in a first tube configuration (depicted by FIG. 5A) the relative rotational positions of the face panel 182 and funnel 185 are such that the face panel window 183 is normal to the tube axis.

When the first and second pair of embossments are aligned 180 displaced, a second tube configuration (shown by FIG. 5B) is formed with the face panel window 183 exhibiting a predetermined tilt relative to the tube axis 187.

Figure 1:
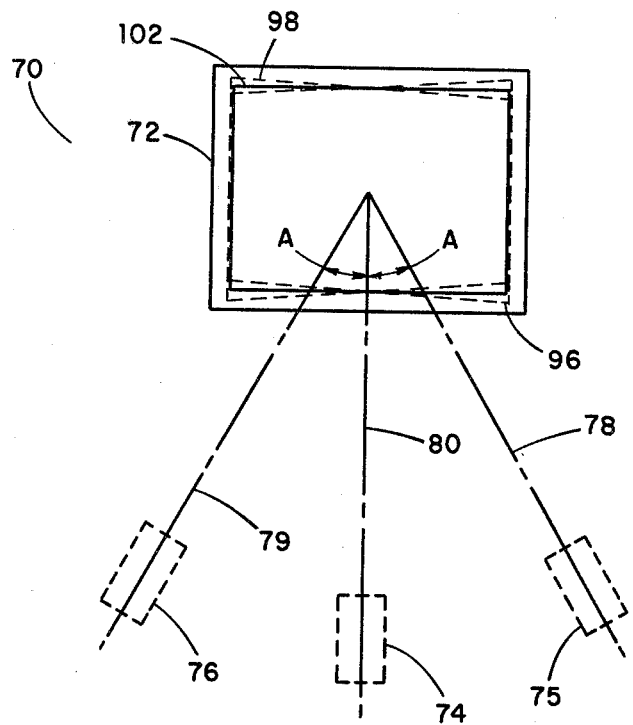
FIG. 1 is a highly simplified schematic representation of a projection television system having off-axis light projection means.
Figure 2:
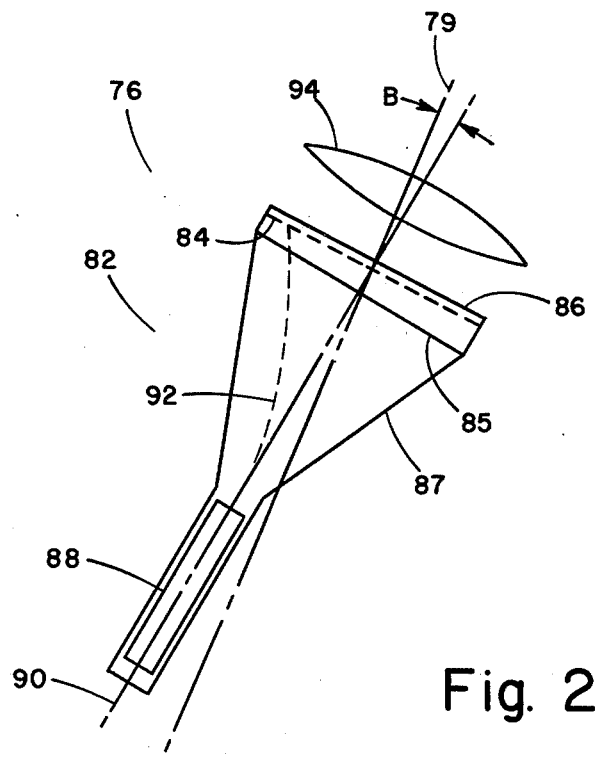
FIG. 2 shows diagramatically and in greater detail one such off-axis projection means.
Figure 3:
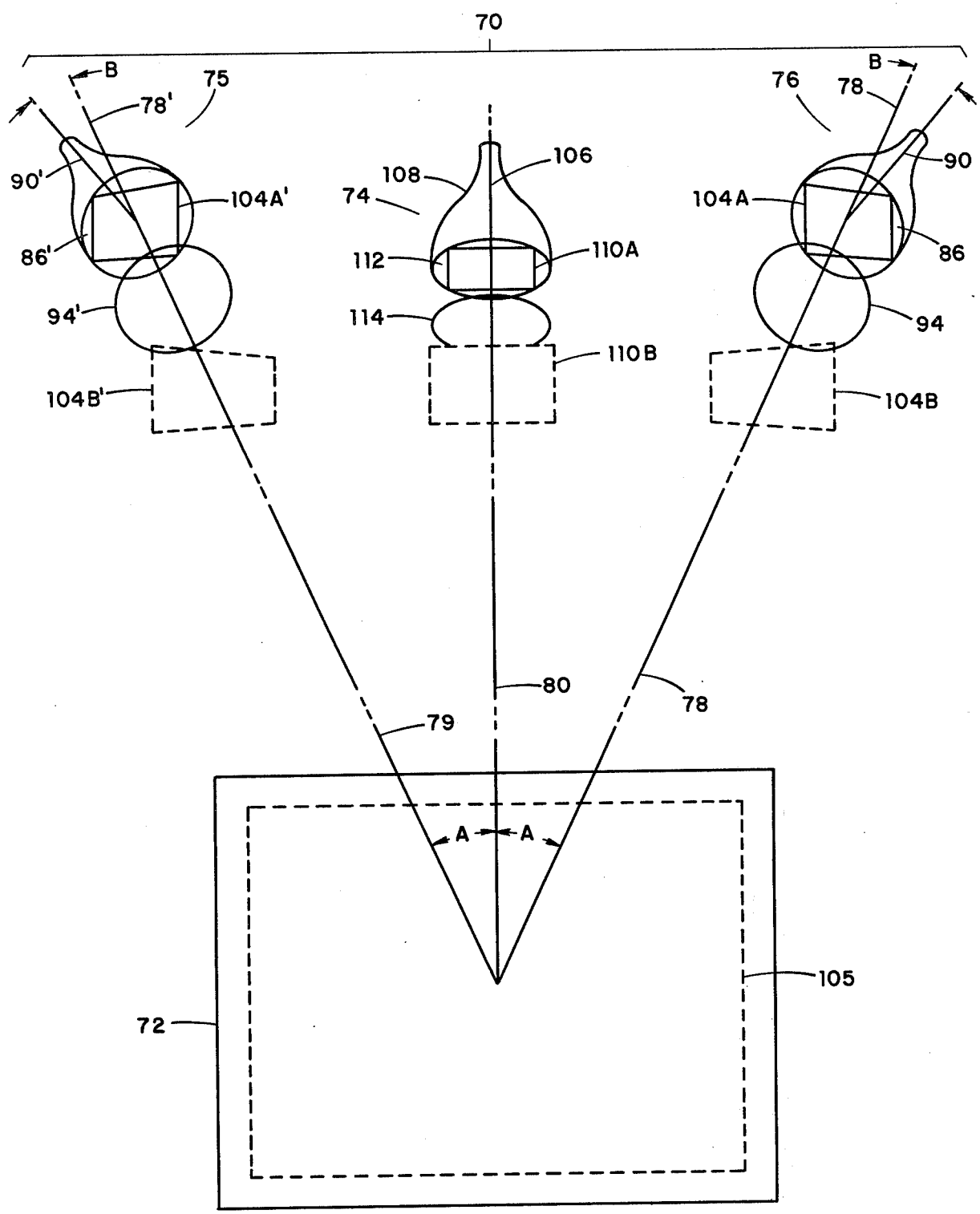
FIG. 3 is a simplified view partially in perspective of a projection television system having three light projection means.

One pair of glass molds can be utilized according to the invention disclosed in referent copending application Ser. No. 154,197 for the manufacture of both the on-axis tube and the off-axis tubes, while providing for compensating for non-linear magnification distortion of the projected image of the displaced-axis tubes. A projection television system of this type is depicted in FIGS. 1 and 2, wherein an on-axis tube 74 is shown in conjunction with two such displaced-axis tubes 75 and 76. The method comprises the following, with reference to FIGS. 4A-C.

The funnel seal edges 186 of both the on-axis tube (of which there can be only one) and a displaced-axis tube are each formed by one of a pair of funnel molds to define planes whose normal makes an angle substantially equal to one-half the aforedescribed angle A with respect to the funnel axis. Similarily, the face panel seal edges on the on-axis tube and a displaced-axis tube are formed by the other one of the pair of molds to define a plane whose normal makes an angle substantially equal to one-half the angle A with respect to the face panel axis. The funnel of the displaced-axis tube is aligned with respect to its face panel by the rotation of the funnel with respect to the panel to provide a predetermined tilt of the electron-optical axis with respect to the projection optical axis by an angle B substantially equal to angle A. This configuration is depicted by FIG. 4B. The funnel of the on-axis tube is aligned and conjoined with respect to its face panel so that the electron-optical axis 194 is coincident with the projection optical axis 190. This configuration is depicted by FIG. 4C. The seal edges 186 and 188 of the respective tubes are then conjoined as by flame sealing forming seal land 192. The face panels and funnels of both an on-axis tube and an off-axis tube can be formed by one such pair of glass molds.

The improvement comprises, prior to the aforedescribed alignment steps, forming a first pair and a second pair of embossments on the funnel and face panel skirt, respectively, using respective ones of a pair of molds. As noted, each member of each pair of embossments is formed 180 degrees apart and adjacent to the respective seal edge. The azimuthal position of the first and second pairs of embossments is predetermined such that the relative rotational positions of the face panel and funnel and a predetermined tilt of the electron-optical axis of the tube with respect to its projection optical axis is indicated.

With reference again to FIG. 5A, there is indicated additionally a neck 202, a flare 204 and an anode button 206. The yoke reference line 208, deflection center 210, and a neck splice line 212 are also indicated. The angle of deflection 214 of the electron beam (not indicated) from deflection center 210 is preferably 70 degrees. The electron-formed visible image 216 is indicated in FIG. 5C as being rectilinear in shape and essentially occupies an area on face panel 182 as depicted. The minimum useful screen area for the visible image 216 comprises an area of circular face panel 182 of three inches by four inches, with a five-inch diagonal.

The dimensions in inches of the cathode ray tube 180 depicted by way of example in FIG. 5A may be as follows. All dimensions and values cited in the following, as well as those in other parts of the specification, are provided by way of example only, and are intended to be in no way limiting. Changes in dimensions and configurations will no doubt occur to those skilled in the art—changes which are yet within the scope and compass of the invention.

diameter of face panel 182: 6.25
overall length of CRT 180: 11.25
O. D. of neck 202: 1.125
I. D. of neck 202: 0.955
distance between face panel and—
  yoke reference line 208: 3.65
  deflection center 210: 3.97

The value of the respective angles B and C in degrees may be, for example (please refer to FIG. 4B):

Angle B: 4.74
Angle C: 2.37

The dimensions of the embossment according to the invention may be, by way of example, 0.020 inch high by 0.020 inch wide by 0.25 inch long.

Figure 5D:
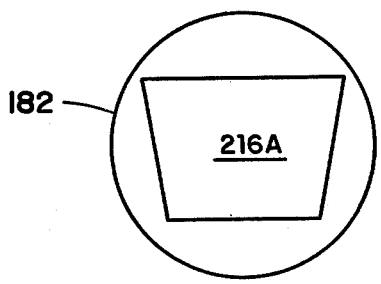

FIG. 5B depicts a displaced-axis tube of like construction, and noted as being a second tube configuration according to the invention, having the same basic dimensions as the aforedescribed on-axis tube. The funnel 185 is aligned with respect to its face panel such as to tilt the electron-optical axis 187 with respect to the projection optical axis 190 by an angle B, and conveying the effect of the face panel being tilted with respect to the funnel axis. The electron-formed visible image 216A is displaced in a measure; however, it remains within the field of the cathodoluminescent screen 183. The beneficial non-linear magnification distortion of the image 216A resulting from application of the invention is shown by FIG. 5D.

With reference to FIG. 6, it will be noted that the embossments according to the invention are preferably in alignment with a minor axis 228 of the window, or screen, 183. The embossments could as well be aligned with a major axis 230, or lie on any desired diagonal of window 183. The aforedescribed rotation of the face panel with respect to the funnel is indicated by arrow 232.

The embossments which represent the preferred embodiment of the invention provide for facilitating the alignment of the funnel and face panel. For example, preparatory to the conjoining of the funnel and face panel as by the well known flame-sealing procedure, a face panel and a funnel can each be held by a separate fixture. The fixtures are slidably mounted on a lathe-type bed which provides for the coaxial alignment of the face panel-funnel components. Each fixture has a recess for accepting a respective embossment on the face panel and the funnel. Either the fixture for the face panel, or the fixture for the funnel, can be rotated to make the electron optical axis of the funnel either coincident with the axis of the face panel (for on-axis projection tubes), or, either can be rotated 180 to provide the predetermined tilt angle (for off-axis tubes). Following the procedure described the face panel and funnel can be conjoined as by frit-sealing, as noted.

The embossments are also valuable as indexing means during installation of projection cathode ray tubes in the projection system cabinet. For example, each projection cathode ray tube may be nested in an "optical bed" located in the projection television cabinet, wherein the face panel of the tube is inserted into a socket having recesses for accepting the embossments. This engagement of the embossments provides for approximate azimuthal location of the projection tube face panel with the associated lens means.

While particular aspects of the inventive method thereof have been shown and described, it will be obvious to those skilled in the art that changes and modifications may be made without departing from the invention in its broader aspects, and thereof, the aim of the appended claims to cover all such changes and modifications as fall within the true spirit and scope of the invention.

I claim:

1. For use in a projection television system, an article of manufacture comprising a glass cathode ray picture tube having a funnel and a circular face panel with a rearwardly extending skirt and a window for receiving a rectangular cathodoluminescent screen, said skirt being conjoinable with said funnel by mating along interfacing seal edges on said skirt and on said funnel, with the seal edge of said skirt defining a plane whose normal makes a non-zero acute cant angle with respect to the axis of said window, and with the seal edge of said funnel defining a plane whose normal makes a non-zero acute cant angle with respect to the funnel axis, said tube being characterized by having a first pair of embossments on said funnel azimuthally spaced 180 degrees apart adjacent to said seal edge of said funnel, and a second pair of embossments on said face panel skirt azimuthally spaced 180 degrees apart adjacent to the seal edge on said skirt, the azimuthal position of said first and second pairs of embossments on said funnel and face panel skirt being predetermined such that when said pairs are aligned in a first tube configuration, the relative rotational position of the face panel and funnel are such that the face panel window is normal to the tube axis, and such that when said first and second pairs of embossments are aligned 180 degrees displaced, a second tube configuration is formed with the face panel window exhibiting a predetermined tilt relative to the tube axis.

2. For use in a projection television system, a cathode ray picture tube whose projection optical axis is displaced from the axis of a remotely located viewing screen by a non-zero acute angle A, and with a cathodoluminescent imaging screen whose axis is substantially coincident with said projection optical axis and normally coincident with the electron-optical axis of said tube, said imaging screen providing an electron-formed visible image for projection on said viewing screen, said cathode ray picture tube having a circular face panel with a rearwardly extending skirt conjoinable with a funnel mating along interfacing seal edges, the seal edge of said funnel being formed to define a plane whose normal makes an angle with respect to the funnel axis substantially equal to one-half said angle A, and with the seal edge of said face panel being formed to define a plane whose normal makes an angle with respect to the imaging screen axis substantially equal to one-half said angle A, said funnel being aligned with respect to said face panel to provide a predetermined tilt of electron-optical axis with respect to said projection optical axis by an angle B substantially equal to said angle A, such that when said seal edges are conjoined, the value of said angle B and the orientation of said electron-optical axis causes said electron-formed visible image to have an orientation and non-linear magnification distortion effective to substantially compensate for the off-axis-induced, non-linear magnification distortion of the light image projected thereby on said viewing screen, said tube being characterized by having a first pair of embossments on said funnel azimuthally spaced 180 degrees apart adjacent to said seal edge of said funnel, and a second pair of embossments on said face panel skirt azimuthally spaced 180 degrees apart adjacent to seal edge on said skirt, the azimuthally position of said first and second pairs of embossments on said funnel and said skirt being predetermined such that the alignment of said pairs is effective to indicate the relative rotational positions of the face panel and funnel and to indicate said predetermined tilt of said electron-optical axis with respect to said projection optical axis.

3. For use in the manufacture of a projection television system having at least one cathode ray picture tube whose projection optical axis is displaced from the axis of a remotely located viewing screen by an angle A, and with a rectangular cathodoluminescent imaging screen whose axis is substantially coincident with said projection optical axis and normally coincident with the electron-optical axis of said tube, said imaging screen providing and electron-formed visible image for projection on said viewing screen, said cathode ray picture tube having a circular glass face panel with a rearwardly extending skirt conjoinable with a funnel along interfacing seal edges, the method of manufacture being of the type including the steps of:

(a) forming the funnel seal edge to define a plane whose normal makes an angle with respect to the funnel axis substantially equal to one-half said angle A;

(b) forming the face panel seal edge to define a plane whose normal makes an angle with respect to the imaging screen axis substantially equal to one-half said angle A;

(c) aligning said funnel with respect to said face panel by the angular rotation of said funnel with respect to said panel to provide a predetermined tilt of said electron-optical axis with respect to said projection optical axis by an angle B substantially equal to said angle A to provide a beneficial non-linear magnification distortion of said image;

(d) conjoining said seal edges;

the improvement comprising;

prior to step (c), forming a first pair of embossments on said funnel azimuthally spaced 180 degrees apart adjacent to the seal edge of said funnel;

forming a second pair of embossments on said skirt of said face panel azimuthally spaced 180 degrees apart adjacent to said seal edge of said panel;

predetermining the azimuthal position of said first and second pair of embossments such that the alignment of said pairs is effective to indicate the relative rotational positions of the face panel and funnel and a predetermined tilt of said electron-optical axis with respect to said projection optical axis.

4. For use in the manufacture of a projection television system having a cathode ray picture tube whose projection optical axis is on the axis of a remotely located viewing screen, and at least one displaced-axis cathode ray picture tube; that is, a tube whose projection optical axis is displaced from the axis of said viewing screen by an angle A, each tube having a face panel with a cathodoluminescent imaging screen whose axis is coincident with its projection optical axis and normally coincident with its electron-optical axis, said imaging screens providing electron-formed visible images for projection on said viewing screen, said tubes further having conjoinable face panels and funnels of like construction which mate along interfacing seal edges and which may be formed by one pair of glass molds consisting of a mold for said face panels and a mold for said funnels, said pair of molds being utilized for manufacture of both said on-axis tube and said displaced axis tube while providing for the compensating of the non-linear magnification distortion of the projected image of the displaced axis tube caused by the location of said tube off the viewing screen axis, the method of manufacture for each tube including the steps of:

(a) forming the seal edge on said funnel by said mold for said funnels to define a plane whose normal makes an angle substantially equal to one-half said angle A with respect to the axis of said funnel;

(b) forming the seal edge of said face panel by said mold for said face panels to define a plane whose normal makes an angle substantially equal to one-half said angle A with respect to the axis of said cathodoluminescent imaging screen;

(c) aligning the funnel of a displaced-axis tube with respect to its face panel by the rotation of said funnel with respect to said panel to provide a predetermined tilt of said electron-optical axis with respect to said projection optical axis by an angle B substantially equal to said angle A;

(d) aligning the funnel of an on-axis tube with respect to its face panel such that the electron-optical axis is coincident with the projection optical axis;

(e) conjoining said seal edges of said tubes; the improvement comprising:

prior to step (c), forming a first pair of embossments on said funnel by said mold for said funnels, said embossments being formed 180 degrees apart adjacent to the seal edge of said funnel;

forming a second pair of embossments on said skirt of said face panel by said mold for said face panels, said embossments being formed 180 degrees apart adjacent to the seal edge of said panel;

predetermining the azimuthal position of said first and second pair of embossments such that the alignment of said pairs is effective to indicate the relative rotational positions of the face panel and funnel and a predetermined tilt of said electron-optical axis with respect to said projection optical axis.

* * * * *

UNITED STATES PATENT AND TRADEMARK OFFICE
CERTIFICATE OF CORRECTION

PATENT NO. : 4,342,942

DATED : August 3, 1982

INVENTOR(S) : Richard L. Hockenbrock

It is certified that error appears in the above-identified patent and that said Letters Patent is hereby corrected as shown below:

On the title page, delete the following information:

"Related U.S. Application Data

[63] Continuation-in-part of Ser. No. 154,197, May 29, 1980, which is a continuation-in-part of Ser. No. 110,413, Jan. 7, 1980."

In column 1, delete the following information:

"CROSS REFERENCE TO RELATED APPLICATIONS

This application is a continuation-in-part of copending application Ser. No. 154,197 filed May 29, 1980, a continuation-in-part of application Ser. No. 110,413 filed Jan. 7, 1980, now U.S. Patent No. 4,274,110; and is related to but in no way dependent upon application Ser. No. 127,603 filed Mar. 3, 1980, all of common ownership herewith."

In column 3, lines 52-54, delete:

".. shown in referent copending application Ser. No. 154,197, of which the present application is a continuation-in-part." and substitute --shown in U.S. Patent No. 4,393,329.---.

In column 4, lines 16-17, delete:

"... and claimed in referent copending application Ser. No. 145,197." and substitute --in U.S. Patent No. 4,393,329.---.

UNITED STATES PATENT AND TRADEMARK OFFICE
CERTIFICATE OF CORRECTION

PATENT NO. : 4,342,942

DATED : August 3, 1982

INVENTOR(S) : Richard L. Hockenbrock

It is certified that error appears in the above-identified patent and that said Letters Patent is hereby corrected as shown below:

In column 4, line 53, after "FIG. 13B", insert
--in U.S. Patent No. 4,393,329--.

In column 5, lines 28-29, delete:
"... referent copending application Ser. No. 154,197"
and substitute --U.S. Patent No. 4,393,329--.

Signed and Sealed this

Eighth Day of May 1984

[SEAL]

Attest:

GERALD J. MOSSINGHOFF

Attesting Officer

Commissioner of Patents and Trademarks